April 1, 1952     W. E. GILSON     2,591,252
PORTABLE HYDROTHERAPY APPARATUS
Filed May 19, 1947     3 Sheets—Sheet 2

Inventor:
Warren E. Gilson

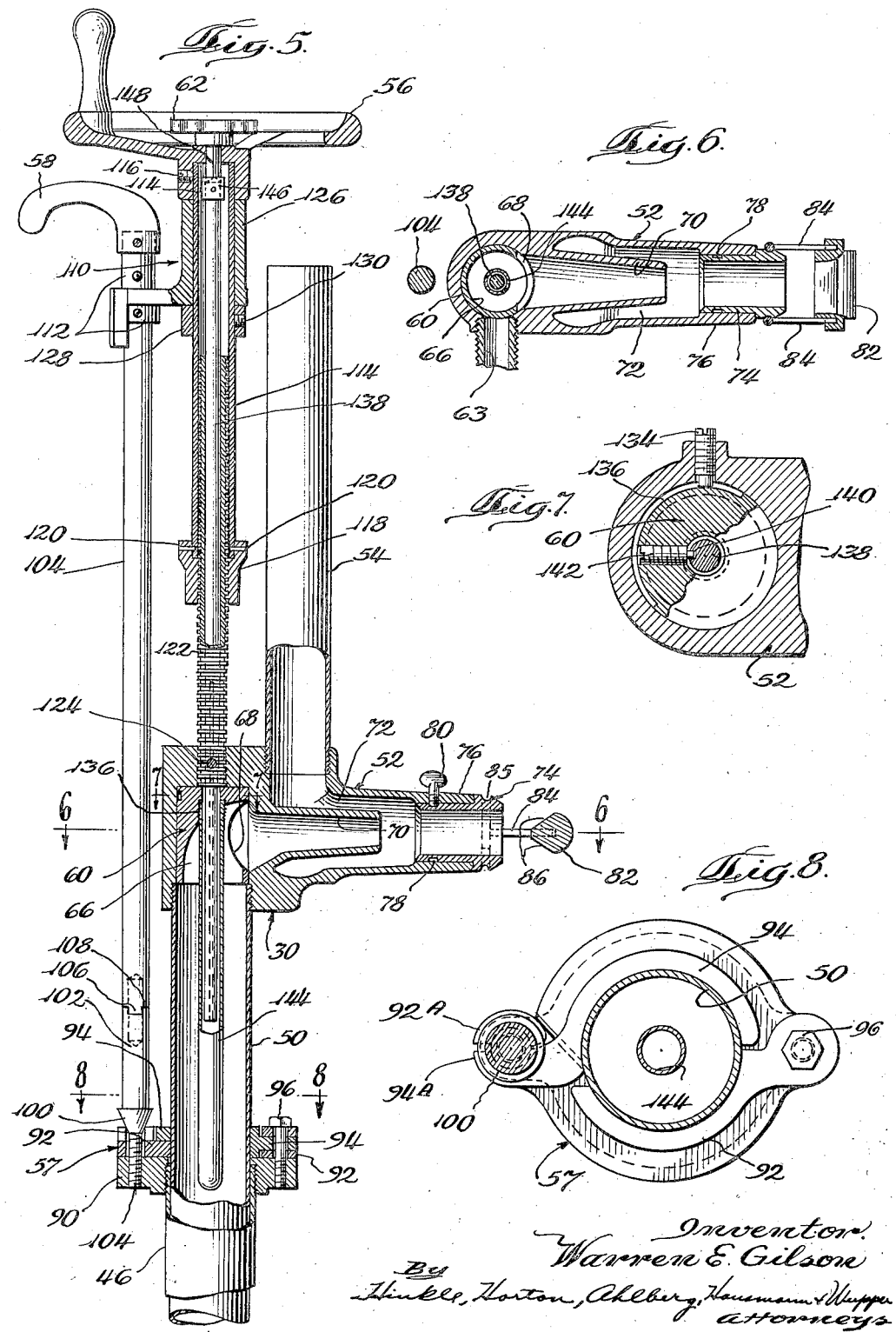

Patented Apr. 1, 1952

2,591,252

UNITED STATES PATENT OFFICE 2,591,252

PORTABLE HYDROTHERAPY APPARATUS

Warren E. Gilson, Madison, Wis., assignor to The Burdick Corporation, Milton, Wis., a corporation of Delaware Application May 19, 1947, Serial No. 748,967

9 Claims. (Cl. 4—180)

The present invention relates to hydrotherapy apparatus and has for its primary object the provision of a new and improved portable hydrotherapy apparatus.

Another object of the present invention is to provide a portable-hydrotherapy apparatus comprising a movable support upon which are mounted a tank, an aeration injection unit within the tank and a motor driven pump located outside the tank connected to the injection unit and tank by conduits passing through the tank, thereby to provide a compact and simplified portable unit.

A further object of the present invention is to provide a new and improved hydrotherapy apparatus including a telescopically mounted aeration unit which is secured to the tank and connected to the discharge outlet of a pump forming part of the apparatus.

Another object of the present invention is to provide a hydrotherapy apparatus including a new and improved movable aeration injection unit.

A further object of the present invention is to provide a hydrotherapy apparatus including a new and improved aeration injection unit which is adjustable both angularly and vertically and which is adapted to be locked in adjusted position.

A still further object of the present invention is to provide a new and improved hydrotherapy apparatus comprising a novel telescopic vertically and angularly adjustable aeration injection unit including, as a component part thereof, a valve adjustable to direct liquid into the aeration unit or to a drain connection.

Another object of the present invention is to provide a new and improved adjustable aeration injection unit which is adjustable vertically and also angularly about a vertical axis and including a valve having vertically disposed actuating means located concentrically relative to said vertical axis, whereby said valve may be moved to direct liquid through the associated aeration unit or to a drain connection.

A further object of the present invention is the provision of a combined nozzle orifice reducing structure and deflector and also a novel deflector.

Other objects and advantages of the present invention will become apparent from the ensuing description in the course of which reference is had to the accompanying drawings, in which:

Fig. 4 is a vertical cross sectional view taken along the broken line 4—4 of Fig. 2;

Fig. 5 is an enlarged vertical cross sectional view illustrating particularly the novel aeration injection unit of the present invention, the view being taken along the line 5—5 of Fig. 2;

Fig. 6 is a horizontal cross sectional view taken along the line 6—6 of Fig. 5;

Fig. 7 is an enlarged fragmentary horizontal cross sectional view taken along the line 7—7 of Fig. 5; and Fig. 8 is an enlarged fragmentary horizontal cross sectional view taken along the line 8—8 of Fig. 5.

Figure 1:
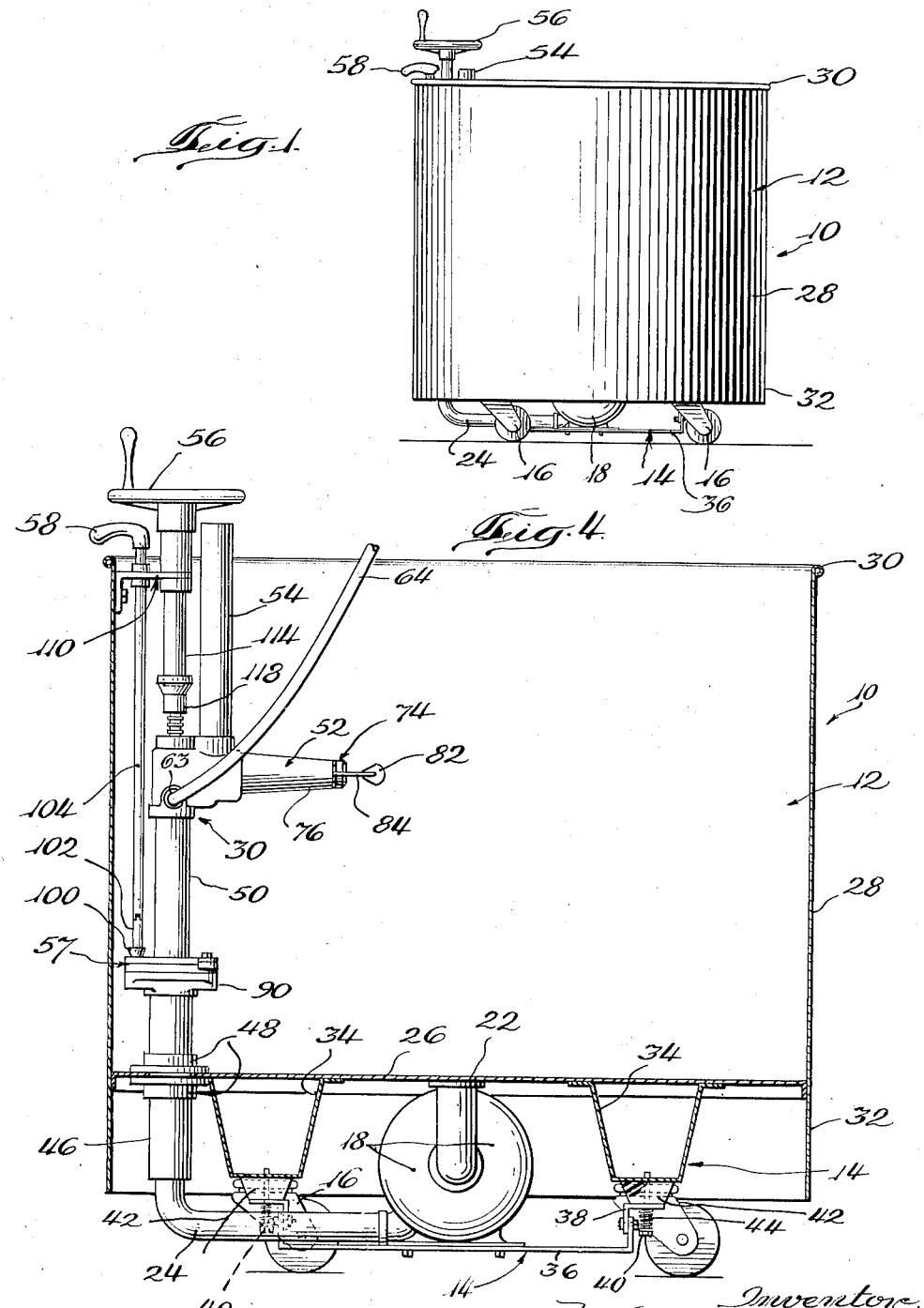
Fig. 1 is a side elevational view, on a reduced scale, of a portable-hydrotherapy apparatus constructed in accordance with the invention.
Figure 2:
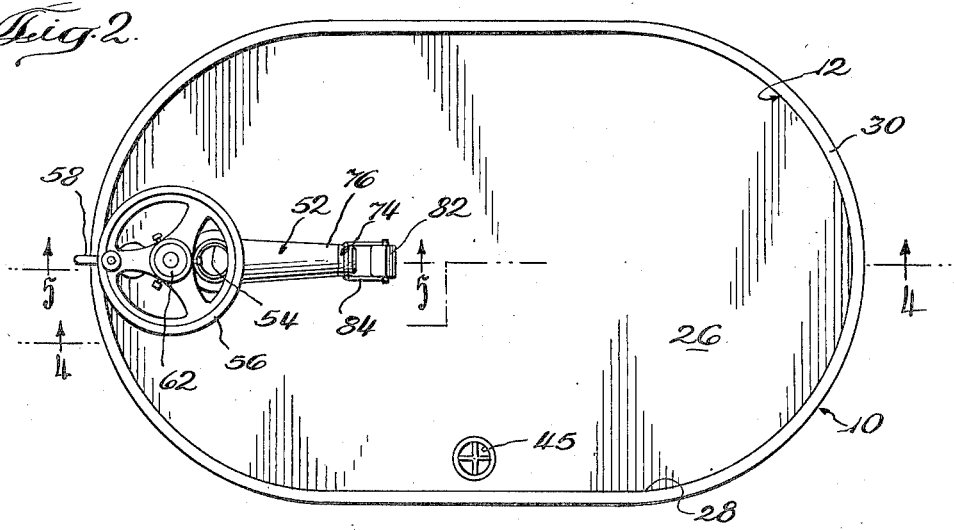
Fig. 2 is a top plan view of the apparatus.
Figure 3:
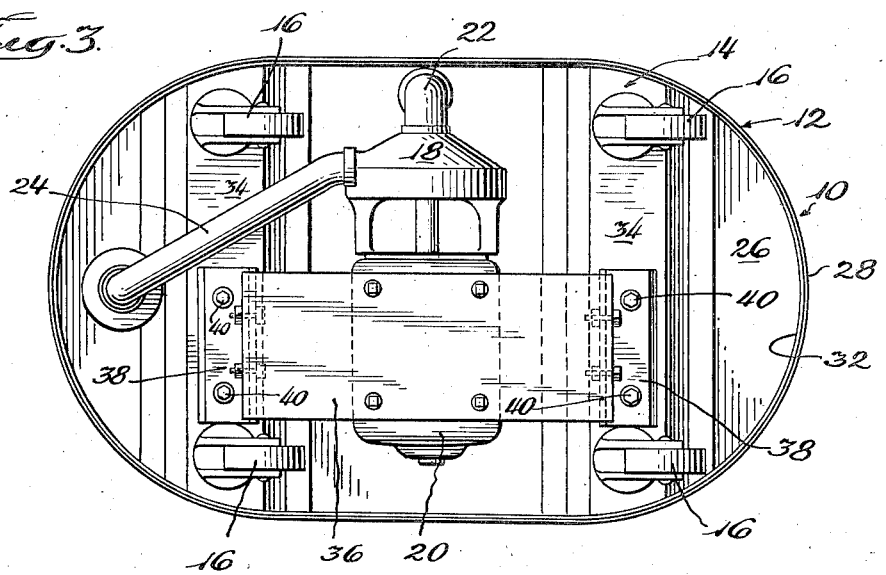
Fig. 3 is a bottom plan view thereof.

Referring first particularly to Figs. 1, 2 and 3, the portable-hydrotherapy apparatus in indicated as a whole by reference character 10. It comprises a tank 12, which may be of elliptical configuration, and a movable support 14 comprising a plurality (4) of casters 16 whereby the unit may be readily moved.

In accordance with the present invention, the apparatus includes also a pump 18 and a pump driving motor 20, both of which are located beneath the tank and with which the pump communicates through an inlet conduit 22 and an outlet or discharge conduit 24. Both of these conduits pass through the tank wall defining structure, preferably the bottom wall 26 of the tank, which also includes the elliptically shaped side wall 28. Another of the features of the invention resides in a novel aeration injection unit, indicated generally by the reference character 30 and the details of construction of which will be described shortly.

As already indicated, the tank includes the bottom well 26 and the side wall 28. The latter is provided with a rolled upper edge 30 to provide rigidity and to prevent injury to patients. The lower end of the tank is extended below the bottom wall 26 to provide an apron 32 which enhances the appearance of the unit and also provides covering for the movable support and the motor driven pump.

The movable support includes the previously referred to casters 16 which are secured to a pair of spaced apart transversely extending channel supports 34, the upper ends of which are secured in suitable manner, as by welding, to the underside of the tank bottom wall 26.

The motor and pump are supported in resilient manner from the channel shaped hangers 34 upon a mounting bracket 36. The bracket has secured to its ends angle supports 38 which are apertured for the passage of mounting bolts 40 mounted in rubber mountings 42. Springs 44 are interposed between the angle supports and the bolt heads so that the supports are located between the rubber mountings and springs, thereby resiliently to support the bracket 36 and the pump and motor.

The pump 20 is of the centrifugal type developing a discharge pressure of about 15 pounds per square inch. Its inlet side is connected by inlet conduit 22 to the tank, the bottom wall of which has an opening near one side, as indicated by the reference character 45 in Fig. 2. The discharge outlet of the pump is connected, as previously indicated, to the tank through the outlet conduit 24. The conduit 24 has an enlarged upwardly extending end 46 which projects through the bottom wall of the tank, and which is secured in watertight manner to the bottom of the tank as by the securing flanges 48 which may be soldered to the conduit and tank bottom wall.

The construction and arrangement of the novel aeration injection unit 30 will now be described with particular reference to Figs. 4 to 8, inclusive. The unit is supported above the upper end of conduit 46 in such manner that it may be moved both vertically and angularly with respect thereto and it has associated with it locking means for securely locking it in its various adjusted positions.

The aeration injection unit includes a liquid supply conduit 50, nozzle defining structure 52 and an air supply conduit 54. The air supply conduit may, if desired, be supplied with an adjustable valve at its upper end for regulating the amount of the air intake. The unit is adapted to be adjusted vertically by means including a handle wheel 56 and angularly either through the nozzle 52 or the air supply conduit 54. It can be locked in adjusted position by a locking mechanism 57 actuated by means including a handle 58 located above the tank and under the hand wheel 56.

In accordance with another feature of the present invention, the aeration injection unit includes an internal valve 60, see particularly Figs. 5, 6 and 7, adapted to be controlled through a hand wheel 62 disposed concentrically to and above the hand wheel 56. In one position of valve 60, aerated liquid is injected into the tank, and in its other position, the liquid is drained through a drain fitting 63 and a drain connection 64 which may take the form of a hose.

The vertical movement of the aeration injection unit is afforded by a telescopic connection between conduits 46 and 50, the latter of which telescopes within the former and moves with the aeration injection unit. The telescopic connection is best illustrated in Fig. 5 from which it may be noted that the conduit 50 extends into the conduit 46 so that liquid supplied by the pump flows through the discharge conduit 24, 46 into the conduit 50. The conduit 50 is secured, as by a threaded connection, to the nozzle defining structure 52, which may be a casting. In the operative position of the internal valve 60, as indicated in Fig. 5, the fluid flows from conduit 50 through passageway 66 and port 68 in valve 60 to an internally disposed liquid discharge nozzle 70 around which is located a concentric air passageway 72 communicating with the air supply conduit 54, the latter being secured as by a threaded connection to the nozzle structure.

The liquid discharged through the internal nozzle 70 draws air through the air conduit 54 and the resulting aerated liquid is discharged through a rotatably mounted nozzle reducing fitting 74 adapted to be secured in adjusted angular position relative to the outlet end 76 of the aeration injection nozzle. The adjustment is provided by constructing the fitting 74 with an annular peripheral groove 78 into which the inner end of a thumb screw 80 projects. The screw is adapted to be loosened for adjustment of the fitting and to be tightened to hold the fitting in adjusted position.

In order to direct the aerated liquid over a wider vertical extent, a deflector 82 is mounted a short distance in front of the fitting 74, as by a pair of relatively small diameter spring arms 84 having T-shaped inner ends received in a groove 85 extending around fitting 74. The portion of the deflector facing the fitting is divergent as indicated by reference character 86, so that the discharge is spread over a wider area.

The aeration injection unit 30 is adapted to be locked in adjusted positions by the locking means 57 actuated by handle 58. The locking means includes a collar 90 secured as by a threaded connection to the upper end of conduit 46. A pair of oppositely movable clamping elements 92 and 94 are movably mounted upon and above the collar. These elements are generally semicircular in configuration, as best illustrated in Fig. 8, and when moved toward each other clamp the conduit 50, thereby locking the aeration injection unit. The elements are secured in pivoted relationship to each other and the collar 90 by a pivot bolt 96 passing therethrough and into the collar. The ends of the elements opposite the pivot bolt, which are indicated by reference characters 92A and 94A, are crossed so that when they are forced apart, the clamping elements engage the conduit 50 and hold it against movement. The clamping elements are moved to clamp the conduit 50 upon rotation of the handle 58 by the downwardly tapered portion 100 of a clamping element operating rod 102, the lower end of which is threaded, as indicated by the reference character 104 (see Fig. 5), into a threaded opening in the collar 90. When the rod 102 is rotated clockwise, looking at it from above, the tapered portion 100 is moved downwardly to force the ends 92A and 94A of the clamping elements apart, thereby to clamp the conduit 50 and the aeration injection unit. To release the unit, the rod 102 is rotated in the opposite direction, whereupon the clamping elements 92 and 94 release the conduit 50. The handle 58 is operatively connected to the rod 102 through a turning rod 104 drivingly connected to the rod 102 as by a tongue 106 on the rod and a groove 108 at the bottom of rod 104. The upper end of the turning rod 104 is rotatably mounted upon a bracket 110 bolted to the inside of tank wall 28 and extending in cantilever fashion into the tank. The turning rod is prevented from moving axially relative to the bracket by spaced collars 112 at opposite sides of the bracket and secured to rod 104.

The aeration injection unit is moved vertically in one direction or another by rotation of the hand wheel 56 in opposite directions. The operative connection of the hand wheel to the unit includes a tube 114 secured to the handle, as by a set screw 116, an internally threaded nut 118 secured to the lower end of the tube as by a plurality of pins 120, and an externally threaded hollow rod 122 threaded into and secured to the upper end of casting 52 by pin 124. When the handle is rotated, the tube 114 and the nut 118 attached to it are rotated. These elements are prevented from moving vertically relative to the tank, and particularly the supporting bracket 110 by the sleeve-like upwardly extending portion 126 of the bracket, the upper end of which abuts against hand wheel 56, and a collar 128 secured immediately below the bracket as by a set screw 130. Consequently, when the nut is rotated, it cannot move vertically so that the threaded rod 122 is moved vertically in a direction dependent upon the direction of rotation of the hand wheel. It may perhaps be mentioned that it is not necessary to provide means for positively preventing the aeration injection unit from rotating when the handle is turned, as it can be prevented from doing this very easily by grasping the nozzle of air supply conduit 54.

The liquid within the tank can be pumped out into a drain or the like through the hose 64 when the valve 60 is turned so that its outlet port 68 opens to the drain discharge fitting 63, see particularly Fig. 6, to which the hose is attached. In Fig. 6 the port 68 is illustrated opening to the liquid discharge nozzle 70, but if the valve 60 is rotated clockwise 90 degrees, then the port 68 opens to the drain fitting 63. In order that the internal valve 60 can be readily moved to either of its two positions, it is provided with means restricting its angular movement. This means comprises a threaded pin 134 extending through the casting 52 into an external peripheral groove 136 in the valve 60, as best illustrated in Fig. 7.

The operative connection between the valve 60 and handle 62 includes a rod 138 extending through the tube 114 and the externally threaded rod 122. It has a splined connection with the valve, this connection including a groove 140 on the rod and a pin 142 fitting into the groove and threaded through the valve member 60. The rod 138 extends axially through the valve 60, as best illustrated in Fig. 5, but leakage of liquid thereby is prevented by a tubular closure 144 encircling the lower end of the rod and secured, as by a threaded connection, with the valve member 60.

In order that the hand wheels 56 and 62 be independent of each other, the latter and its associated mechanism are relatively rotatable with respect to the former and its associated mechanism. For this purpose the upper end of the rod 138 is fixedly secured to a coupling element 146 having a reduced portion 148 extending through the hub of hand wheel 58 in such manner that wheels 56 and 62 are relatively free of each other and the turning of one does not interfere with the turning of the other.

As particularly evident from Fig. 1, a hydrotherapy unit constructed in accordance with the present invention is compact and pleasing in appearance. The construction is also simple, requiring a minimum of conduits, because of the mounting of the motor and pump upon the movable support and making the connections from the pump to the tank through the bottom wall of the latter.

In operation, the tank is filled with a desired quantity of liquid. After the person or part of the person to be treated has been placed in the tank the motor is operated with the valve 60 in the position in which it is indicated in Figs. 5 and 6, i. e., so that liquid is circulated by the motor driven pump. The liquid enters the inlet side of the pump from the bottom of the tank and is forced through the discharge conduit 24, 46 into the dependent liquid supply conduit 50 of the aeration injection unit 30. The liquid is forced through the internal liquid nozzle 70 so that air is drawn through the air inlet conduit 54, which extends above the level of liquid in the tank. The aerated liquid is forcibly ejected through outlet fitting 74 and past the deflector 82 against the patient.

In use, the aeration injection unit is locked by the lock 57, which is operated by the handle 58. If it is desired to alter the position of the unit, the lock is released by manipulation of the handle 58 so that the unit 30 may be raised or lowered as desired by rotation of the hand wheel 56. When the hand wheel is rotated, the unit supporting rod 122 is raised or lowered thereby to raise or lower the unit depending upon the direction of rotation of the hand wheel 56 and the nut 118 secured to the handle through the dependent tube 114.

The angular position of the aeration injection unit can also be adjusted when the locking mechanism is released. This is accomplished simply as by grasping the air inlet tube 54 and swinging the unit. After the desired vertical angular adjustments have been made, the unit is again locked by manipulation of the hand wheel 58.

The deflector 82, which spreads the jet of aerated liquid over a wider area, can readily be removed by exerting a pull thereon, thereby to release the spring fingers 84 from the cooperating groove 85 on the nozzle reducing fitting 74. With the deflector removed, a more localized action of the jet is possible. Should it be desired to reduce the velocity of the jet, the fitting 74 can be removed readily by releasing the thumb screw 80.

After the treatment has been completed, the pump can be utilized to drain the tank. To do this the valve 60 is moved through its associated hand wheel 62 to bring the valve port 68 into registry with the drain fitting 63. When this is done, liquid no longer flows through the aeration injection unit but is forced through the fitting 63 and hose 64.

While the present invention has been described in connection with the specific details of a particular embodiment thereof, it should be understood that the details thereof are not intended to be limitative of the invention except in so far as set forth in the accompanying claims.

Having thus described my invention, what I claim as new and desire to secure by Letters Patent of the United States is:

1. Hydrotherapy apparatus including a tank, a liquid inlet conduit entering said tank through the lower part thereof having a vertically extending portion within said tank, a pump external of said tank for supplying liquid under pressure to said conduit, and an aeration injection unit movably supported within said tank having a conduit in telescoping relation with said vertically extending portion.

2. Hydrotherapy apparatus including a vertically movable aeration injection unit, a pair of clamping elements each partially encircling a portion of said unit, means supporting said elements for pivotal movement toward and away from said portion, said elements overlapping at a point spaced from the point of pivotal support, and manually operable vertically movable wedging means engageable with the overlapping portions of said elements for separating said overlapping portions.

3. Hydrotherapy apparatus including a tank, a liquid inlet conduit extending into said tank through a portion thereof, an aeration injection unit communicating with said inlet conduit, and means movably supporting said unit within said tank, said last mentioned means including an externally threaded support fixedly secured to said unit, an internally threaded nut supporting said externally threaded support, means supporting said nut for rotation but preventing it from moving axially, and means for rotating said nut.

4. Hydrotherapy apparatus including a tank, a liquid inlet conduit extending into said tank through a portion thereof, an aeration injection unit communicating with said inlet conduit, and means movably supporting said unit within said tank, said last mentioned means including a threaded element fixedly secured to said unit, a second threaded element supporting said first threaded element, means supporting said second threaded element for rotation but preventing it from moving axially, and means for rotating said second threaded element.

5. Hydrotherapy apparatus including a tank, a liquid inlet conduit extending into said tank through a portion thereof, an aeration injection unit communicating with said inlet conduit, and means movably supporting said unit within said tank, said last mentioned means including a threaded support fixedly secured to said unit, a threaded element supporting said threaded support, a tubular member surrounding said threaded support and secured to said element, a rotatable handle secured to the upper end of said tubular member, and a bracket secured to the inside of said tank supporting said handle and thereby said tube, said threaded element and support, and said unit.

6. Hydrotherapy apparatus including a tank, a liquid inlet conduit extending into said tank through a portion thereof, an aeration injection unit communicating with said inlet conduit, means movably supporting said unit within said tank, said last mentioned means including a threaded element fixedly secured to said unit, a second threaded element supporting said first threaded element, means supporting said second element for rotation but preventing it from moving axially and means for rotating said second threaded element, said aeration injection unit including a drain opening and a valve movable to connect said opening with said inlet conduit, and means for moving said valve, said last mentioned means including operating means extending through both said threaded elements and being movable relative thereto.

7. Hydrotherapy apparatus including a tank, a liquid inlet conduit extending into said tank through a portion thereof, an aeration injection unit communicating with said inlet conduit having discharge and drain openings and valve means movable to connect said inlet conduit selectively to said openings, means movably supporting said unit within said tank, said last mentioned means including a threaded support fixedly secured to said unit, a threaded element supporting said threaded support, a tubular member surrounding said threaded support and secured to said element, a rotatable handle secured to the upper end of said tubular member, and a bracket secured to the inside of said tank supporting said handle and thereby said tube, said threaded element and support, and said unit, and valve means operating means also supported by said bracket.

8. A hydrotherapy apparatus including a tank, a liquid inlet conduit extending into said tank, an aeration injection unit communicating with said inlet conduit, means movably supporting said unit within said tank, said last mentioned means including an exteriorly threaded tube fixedly secured to said unit, an interiorly threaded nut supporting said tube, a support for supporting said nut for rotation but preventing it from moving axially, means for rotating said nut, said aeration injection unit including an injection nozzle, a drain opening and a valve movable to connect said inlet conduit selectively with said nozzle and said opening, and a valve control rod for moving said valve extending through said tube and said nut and being movable relative thereto.

9. Hydrotherapy apparatus including a tank, a liquid conduit extending into said tank through the lower part thereof, a pump external of said tank for supplying liquid under pressure to said conduit, an aeration injection unit movably supported within said tank and connected to said conduit, and a portion of said conduit within said tank being extensible and collapsible as to length to permit vertical movement of said aeration injection unit.

WARREN E. GILSON.

REFERENCES CITED

The following references are of record in the file of this patent:

UNITED STATES PATENTS

| Number | Name | Date |
|---|---|---|
| 1,041,524 | Snyder et al. | Oct. 15, 1912 |
| 1,305,411 | Rico | June 3, 1919 |
| 2,091,167 | Solley | Aug. 24, 1937 |
| 2,116,935 | Richard et al. | May 10, 1938 |
| 2,228,698 | Fitches | Jan. 14, 1941 |
| 2,279,150 | Thom | Apr. 7, 1942 |
| 2,280,979 | Rocke | Apr. 28, 1942 |